United States Patent [19]

Mendoza

[11] Patent Number: 4,854,847
[45] Date of Patent: Aug. 8, 1989

[54] TORTILLA DOUGH FORMING MACHINE

[76] Inventor: Fausto C. Mendoza, Calzada San Esteban Num 57, Naucalpan de Juarez, Mexico

[21] Appl. No.: 217,177

[22] Filed: Jul. 11, 1988

[51] Int. Cl.$^4$ .......................... B29C 47/64; B29B 7/14; B29B 7/16

[52] U.S. Cl. .................................. 425/205; 425/206; 425/208; 425/209; 425/382.3; 425/461; 264/177.1; 366/88; 366/323; 426/516; 426/517

[58] Field of Search ................................ 425/205–209, 425/382.3, 131.1, DIG. 17, DIG. 16, 377, 380, 382.4, DIG. 243, 382.4, 461, 145, 147; 264/209.8, 211.21, 349, 118; 426/516, 517, 519; 366/154–157, 79, 81, 83, 84, 88–90, 318, 319, 323, 9

[56] References Cited

U.S. PATENT DOCUMENTS

| | | | |
|---|---|---|---|
| 862,442 | 7/1906 | Orr | 425/380 |
| 1,575,458 | 3/1926 | Stonesifer | 366/154 |
| 3,051,233 | 8/1962 | Baxter, Jr. | 162/337 |
| 4,118,163 | 10/1978 | Lee | 425/146 |
| 4,559,104 | 12/1985 | Eriksson | 366/323 |

FOREIGN PATENT DOCUMENTS

| | | | |
|---|---|---|---|
| 51-15874 | 5/1976 | Japan | 425/382.4 |
| 60-221029 | 11/1985 | Japan | 425/209 |

*Primary Examiner*—Jay H. Woo
*Assistant Examiner*—Mathieu Vargot
*Attorney, Agent, or Firm*—Albert L. Jeffers

[57] ABSTRACT

A tortilla dough forming machine has a hopper, hollow extension and hollow casing mounted in a serial arrangement on a support frame. The hopper receives a mass of tortilla dough through its open top and has a dough discharge outlet. The casing is cylindrical in shape, horizontally disposed, and has a dough entry inlet and a longitudinally-extending elongated narrow slit defined therethrough. The extension extends between and connects the hopper dough discharge outlet in communication with the casing dough entry inlet. A shaft is rotatably mounted to the casing and hopper and extends horizontally and axially through the casing, extension and hopper. A plurality of conveying vanes are attached along the upstream shaft portion extending through the extension and hopper and are operable to convey dough toward and through the hopper dough discharge outlet and through the extension upon rotation of the shaft. A screw conveyor and a conical member are attached in tandem end-to-end relation along the downstream shaft portion extending through the casing. The screw conveyor is disposed upstream of the conical member and adapted to convey dough through the casing toward the conical member upon rotation of the shaft. The conical member is oriented in opposing working relation to the screw conveyor to resist axial flow of dough through the casing past the slit thereby causing radial flow of dough from the casing through the slit.

11 Claims, 2 Drawing Sheets

TORTILLA DOUGH FORMING MACHINE

BACKGROUND OF THE INVENTION

1. Field of the Invention

The present invention generally relates to preparation of tortillas and, more particularly, is concerned with an improved tortilla dough forming machine.

2. Description of the Prior Art

Tortilla forming machines are known that employ extrusion systems. Typically, such a machine is constituted by a vertical conical hopper which at a lower part thereof leads into a chamber having a lengthwise extrusion slit. A rotatable worm or screw conveyor vertically disposed in the hopper has the same shape as the hopper. As a mass of dough is deposited in an upper part of the hopper, the rotating screw conveyor takes up the dough and drives and injects it under pressure toward the lower part of the hopper and toward an inlet to the chamber.

Several other screw conveyors lead from the hopper into the extrusion chamber. The latter screw conveyors then take up the dough from the vertical screw conveyor and introduce the dough into the extrusion chamber from which it exits through the extrusion slit in the form of a continuous curtain of dough. Conventional means known in the art are then employed to cut individual tortilla cakes or blanks from the curtain of dough as it exits the chamber slit.

The above-described prior art tortilla forming machine produces excellent results. However, its cost is high due to the number of parts it includes. For the same reason, its handling and cleaning are complicated and costly. Consequently, a need exists for an improved machine which will effectively overcome the above-mentioned problems without introducing a set of new ones.

SUMMARY OF THE INVENTION

The present invention provides an improved tortilla dough forming machine designed to satisfy the aforementioned needs. The improved machine of the present invention facilitates forming a large bulk or mass of tortilla dough into a curtain of dough from which individual tortilla cakes or blanks can then be made. The improved machine is much lower in cost through savings in its fabrication, as it requires fewer parts and is less complicated. Also, it has fewer mechanisms to be driven; thus, there is a savings in power consumption. Further, due to the simplicity of its mechanisms, the improved machine is easier to handle and maintain. Additionally, the improved machine will work well with large or small masses of dough. For example, in order to operate properly, the prior art machine required a permanent load of 20 to 25 kilograms (44 to 50 pounds) of dough. In contrast thereto, the improved machine can operate well with an amount as low as two kilograms (four and a half pounds), so that the dough can be employed more profitably.

Accordingly, the present invention is directed to a tortilla dough forming machine which comprises: (a) a support frame; (b) a hopper mounted on the support frame and having an open top through which a mass of tortilla dough can be received and a dough discharge outlet; (c) a hollow casing mounted on the support frame in spaced relation to the discharge outlet of the hopper and having a dough entry inlet and an elongated narrow slit defined therethrough and extending longitudinally along a lower portion of the casing; (d) a hollow extension extending between and connecting the dough discharge outlet of the hopper in communication with the dough entry inlet of the casing; (e) an elongated shaft rotatably mounted to the casing and hopper and extending axially through the casing, extension and hopper; (f) a plurality of conveying elements attached along an upstream portion of the shaft extending through the extension and hopper and being operable to convey dough toward and through the dough discharge outlet of the hopper and through the extension upon rotation of the shaft; and (g) a screw conveyor and a conical member attached in tandem end-to-end relation along a downstream portion of the shaft extending through the casing, the screw conveyor being disposed upstream of the conical member and adapted to convey dough through the casing toward the conical member upon rotation of the shaft, the conical member being oriented in opposing working relation to the screw conveyor such that axial flow of dough through the casing past the slit is resisted by the conical member thereby causing radial flow of dough from the casing through the slit.

More particularly, the hopper includes generally vertical opposite end walls and side walls connected together so as to define the open top, one of the end walls having an opening defining the dough discharge outlet. The hopper further includes a generally horizontal curved bottom wall connecting the opposite end walls and side walls so as to define a closed hopper bottom being arcuate-shaped in cross-section so as to define a generally horizontally extending dough conveying trough leading to the one end wall dough discharge outlet.

Also, the casing is cylindrical in shape, extends generally horizontally, and has a pair of opposite ends, one of the ends having an opening defining the dough entry inlet of the casing. The dough entry inlet opening of the casing is smaller in size than the dough discharge outlet opening of the hopper. The extension is truncated conical in shape and extends between and connects the smaller dough entry inlet opening of the casing with the larger dough discharge outlet opening of the hopper.

Further, the conveying elements are a plurality of vanes which extend generally radially from the shaft and have working faces. The vanes are aligned with one another along a spiral path and are displaced from one another axially along and circumferentially about the shaft. Also, the working faces of the vanes are disposed at an angle to both longitudinal and transverse planes through the shaft and each respective vane so as to convey dough toward and through the discharge outlet of the hopper and through the extension upon rotation of the shaft.

The improved machine further comprises a plurality of bars arranged in generally parallel spaced relation to one another and extending generally horizontally across the hopper between the vanes. The bars serve to regulate the gravity flow of upper portions of the mass of dough to the vanes as lower portions of the dough are conveyed axially along the shaft toward the casing.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
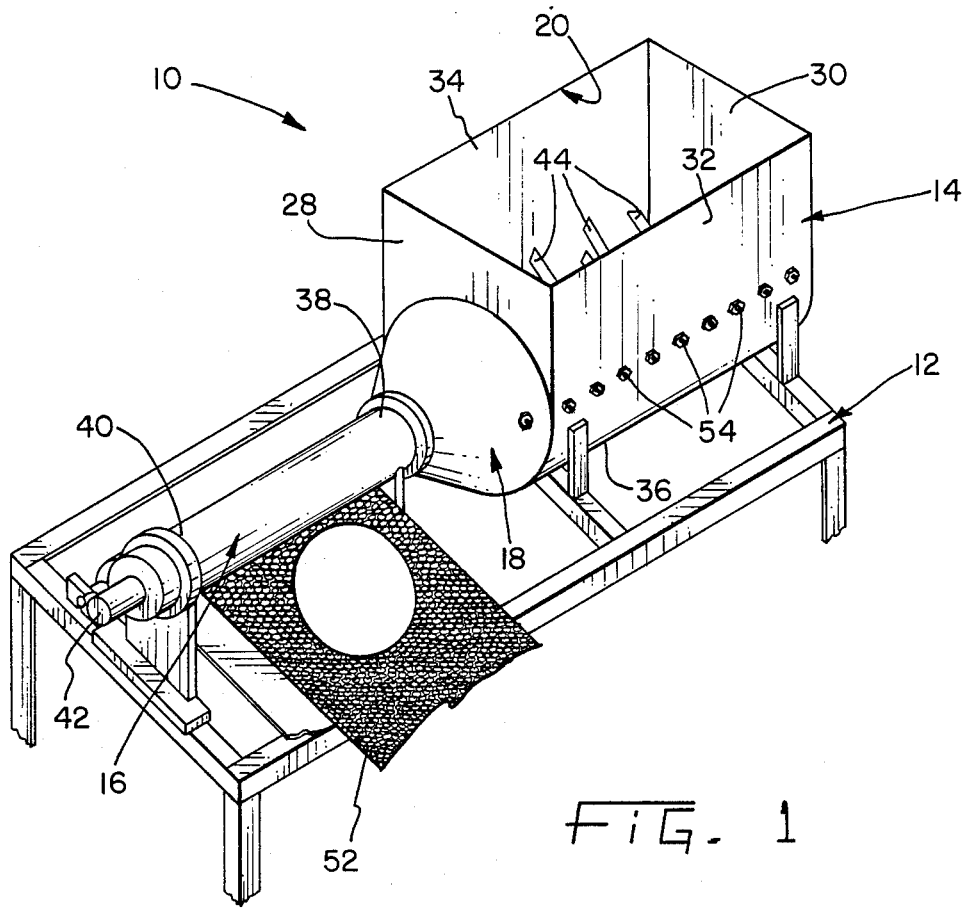
FIG. 1 is a perspective view of a preferred embodiment of the improved tortilla dough forming machine of the present invention.
Figure 2:
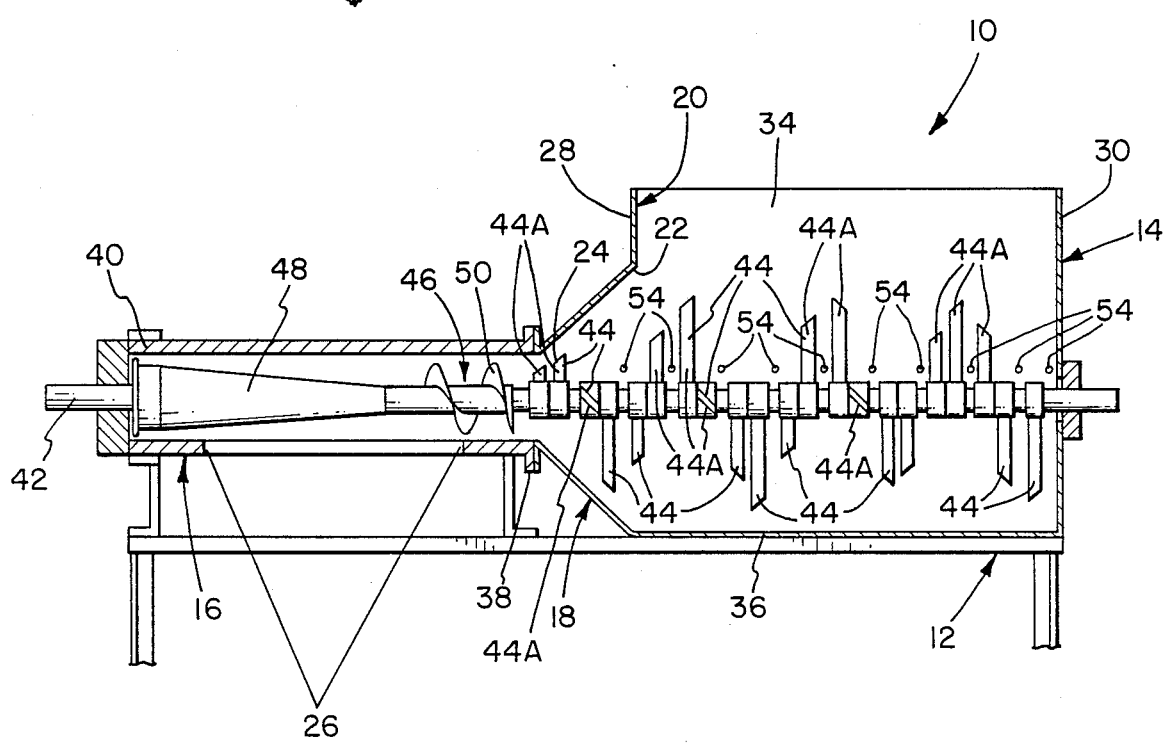
FIG. 2 is a side elevational view of the internal working components of the machine in FIG. 1, with a hopper, extension and casing of the machine being sectioned along a longitudinal vertical plane through a central axis of the machine.
Figure 3:
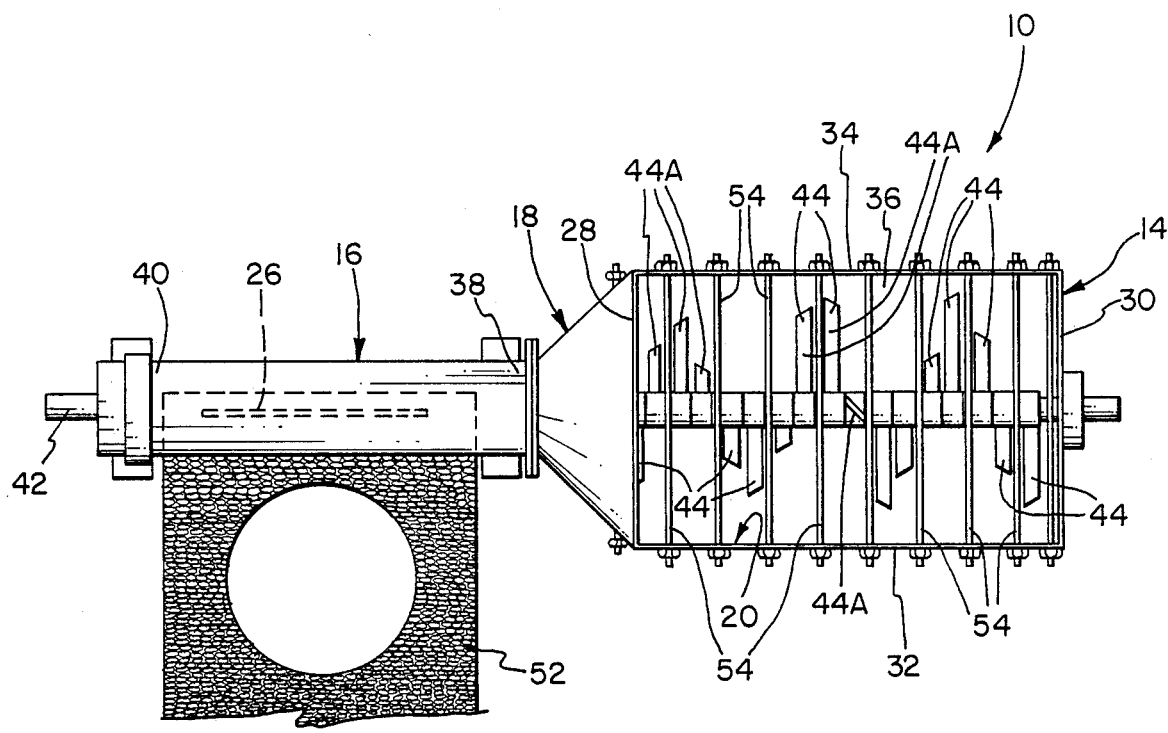
FIG. 3 is a top plan view of the machine of FIG. 1.

Referring now to FIGS. 1-3 of the drawings, there is shown the improved tortilla dough forming machine of the present invention, being generally designated by the numeral 10. In its basic components, the improved machine 10 includes a support frame 12 and a hopper 14, an elongated hollow cylindrical casing 16, and a hollow truncated conical extension 18 mounted in a serial arrangement on the frame 12. The hopper 14 is adapted to receive a mass of tortilla dough through its open top 20 and has an outlet 22 for discharge of the dough. The cylindrical casing 16 is horizontally disposed and spaced from the hopper 14. The casing 16 has a dough entry inlet 24 and a generally horizontally and longitudinally extending elongated narrow dough outlet slot or slit 26 defined through a lower portion of the casing. The truncated conical extension 18 extends between the hopper 14 and casing and connects the dough discharge outlet 22 of the hopper 14 in communication with the dough entry inlet 24 of the casing 16.

More particularly, the hopper 14 is composed of a pair of generally vertical opposite end walls 28, 30 and side walls 32, 34 connected together so as to define the open top 20. The one of the end walls 28 connected with the extension 18 has an opening defining the dough discharge outlet 22 of the hopper 14. The hopper 14 also has a generally horizontal curved bottom wall 36 connecting the opposite end walls 28, 30 and side walls 32, 34 so as to define a closed hopper bottom. The hopper bottom wall 36 is arcuate-shaped in cross-section so as to define a generally horizontally extending dough conveying trough leading to the one end wall discharge outlet opening 28.

The cylindrical casing 16 mounted in spaced relation to the one end wall 28 of the hopper 14 has a pair of opposite ends 38, 40. The one casing end 38 has an opening defining the dough entry inlet 24 of the casing. The casing dough entry inlet 24 is smaller in size (i.e., diameter) than hopper dough discharge outlet 22. Thus, the hollow truncated conical extension 18 extends between and interconnects the one end wall 28 of the hopper 14 and the one end 38 of the casing 16 at their respective larger dough discharge outlet 22 and smaller dough entry inlet 24.

Further, the improved machine 10 includes an elongated central shaft 42 rotatably mounted at its opposite ends to the other end 40 of the cylindrical casing 16 and to the other end wall 30 of the hopper 14. The shaft 42 extends generally horizontally and axially through the casing 16 and extension 18 and through the hopper 14 along and spaced above its curved bottom wall 36.

A plurality of conveying elements in the form of vanes 44 are attached along an upstream portion of the shaft 42 that extends through the truncated conical extension 18 and along the bottom wall 36 of the hopper 14. The vanes 44 have generally planar working faces 44A which are operable to convey dough toward and through the hopper dough discharge outlet 22 and through the extension upon rotation of the shaft 42. The shaft 42 is rotated by any suitable source of power via a drive gear (not illustrated) mounted on either end of the shaft.

Specifically, the vanes 44 attached to the upstream shaft portion extend generally radially from the shaft 42. The vanes 44 are aligned with one another along a spiral path and are displaced from one another axially along and circumferentially about the shaft 42. Also, the working faces 44A of the vanes 44 are disposed at an angle to both longitudinal and transverse planes through the shaft 42 and each respective vane 44. In such arrangement and orientations, the working faces 44A of the vanes 44 are adapted to push or convey dough toward the casing 16 upon rotation of the shaft 42, injecting it under pressure due to the downstream converging configuration of the extension 18 into the interior of the casing 16 through its dough entry inlet 14.

Also, the improved machine 10 includes a screw conveyor 46 and a smooth sliding inverted conical-shaped member 48 attached in tandem end-to-end relation along a downstream portion of the shaft 42 that extends through the cylindrical hollow casing 16. The screw conveyor 46 is disposed upstream of the conical member 48 and its flights 50 are configured to convey dough through the casing 16 toward the conical member 48 upon rotation of the shaft 42. As is apparent in FIG. 2, the conical member 48 and the screw conveyor 46 have adjacent portions overlying the extrusion outlet slit 26 in the bottom portion of the casing 16.

The conical member 48 is placed and oriented in opposing working relation to the screw conveyor 46 so as to resist axial flow of dough through the casing 16 past the slit 26. Therefore, the only avenue for the dough to take is a radially directed flow of dough from the casing 16 through the slit 26 in the form of a dough curtain. Suitable conventional means (not shown) is provided to form individual tortilla dough blanks from the dough curtain, as seen on the netting 52 in FIGS. 1 and 3. It should be understood that the screw conveyor 46 and conical member 48 thus to act to regulate the output of dough through the slit 26.

Finally, the improved machine 10 includes a plurality of elongated bars 54 arranged in generally parallel spaced relation to one another between the end walls 28, 30 of the hopper 14. The bars 54 are situated approximately midway between the bottom and top of the hopper 14, and extend generally horizontally thereacross between, and are fastened to, its opposite side walls 32, 34. Additionally, the bars 54 extend between the vanes 44 as the later are moved in their individual rotational paths upon rotation of the shaft 42. The bars 54 serve to regulate gravity flow of upper portions of the mass of dough between the bars to the rotating vanes 44 as lower portions of the dough are conveyed axially along the shaft 42 toward the casing 16.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A tortilla dough forming machine, comprising:
   (a) a support frame;
   (b) a hopper mounted on said support frame and having an open top through which a mass of tortilla dough can be received and a dough discharge outlet;
   (c) a hollow casing mounted on said support frame in spaced relation to said discharge outlet of said hopper and having a dough entry inlet and an elongated narrow slit defined therethrough and extending longitudinally along a lower portion of said casing;
   (d) a hollow extension extending between and connecting said dough discharge outlet of said hopper in communication with said dough entry inlet of said casing;
   (e) an elongated shaft rotatably mounted to said casing and hopper and extending axially through said casing, extension and hopper;
   (f) a plurality of conveying vanes attached along an upstream portion of said shaft extending through said extension and hopper and being operable to convey dough toward and through said dough discharge outlet of said hopper and through said extension upon rotation of said shaft; and
   (g) a screw conveyor and a conical member attached in tandem end-to-end relation along a downstream portion of said shaft extending through said casing, said screw conveyor being disposed upstream of said conical member and adapted to convey dough through said casing toward said conical member upon rotation of said shaft, said conical member being oriented in opposing working relation to said screw conveyor such that axial flow of dough through said casing past said slit is resisted by said conical member thereby causing radial flow of dough from said casing through said slit;
   (h) said dough entry inlet of said casing is smaller in size than said dough discharge outlet of said hopper, said extension being truncated conical in shape and extending between and connecting said smaller dough entry inlet of said casing and said larger dough discharge outlet of said hopper.

2. The machine as recited in claim 1, wherein said hopper includes substantially vertical opposite end walls and side walls connected together so as to define said open top, one of said end walls having an opening defining said dough discharge outlet.

3. The machine as recited in claim 2, wherein said hopper includes a substantially horizontal curved bottom wall connecting said opposite end walls and side walls so as to define a closed hopper bottom being arcuate-shaped in cross-section so as to define a substantially horizontally extending dough conveying trough leading to said one end wall dough discharge outlet.

4. The machine as recited in claim 1, wherein said casing is cylindrical in shape, extends substantially horizontally, and has a pair of opposite ends, one of said ends having an opening defining said dough entry inlet of said casing.

5. The machine as recited in claim 1, wherein:

said hopper includes substantially vertical opposite end walls and side walls connected together so as to define said open top, one of said end walls having an opening defining said dough discharge outlet, said hopper also including a substantially horizontal curved bottom wall connecting said opposite end walls and side walls so as to define a closed hopper bottom being arcuate-shaped in cross-section; and said casing is cylindrical in shape, extends substantially horizontally, and has a pair of opposite ends, one of said ends having an opening defining said dough entry inlet of said casing.

6. The machine as recited in claim 5, wherein said shaft is rotatably mounted between the other end of said casing and the other end wall of said hopper and extends substantially horizontally and axially through said casing and extension and through said hopper along and spaced above its curved bottom wall.

7. The machine as recited in claim 1, wherein said conveying vanes extend radially from said shaft, are aligned with one another along a spiral path and are displaced from one another axially along and circumferentially about said shaft, each said vane has a working face which is disposed at an angle to both longitudinal and transverse planes through said shaft and said respective vane so as to convey dough toward and through said discharge outlet of said hopper and through said conical extension upon rotation of said shaft.

8. The machine as recited in claim 7, further comprising:

a plurality of bars arranged in substantially parallel spaced relation to one another and extending substantially horizontally across said hopper between said vanes, said bars for regulating the gravity flow of upper portions of the mass of dough to said vanes as lower portions of the dough are conveyed axially along said shaft toward said casing.

9. A tortilla dough forming machine, comprising:
   (a) a support frame;
   (b) a hopper mounted on said support frame, said hopper having opposite end walls and side walls connected together so as to define an open top through which a mass of tortilla dough can be received into said hopper, one of said end walls having an opening defining a dough discharge outlet of said hopper, said hopper having a curved bottom wall connecting said opposite end walls and side walls so as to define a closed hopper bottom being arcuate-shaped in cross-section so as to define a substantially horizontally extending dough conveying trough leading to said one end wall discharge outlet opening;
   (c) a hollow cylindrical casing mounted on said support frame in spaced relation to said one end wall of said hopper, said casing having a pair of opposite ends, one of said ends having an opening defining a dough entry inlet of said casing being smaller in size then said dough discharge outlet opening of said hopper, said casing having an elongated narrow slit defined therethrough and extending longitudinally along a lower portion of said casing;
   (d) a hollow truncated conical extension extending between and interconnecting said one end wall of said hopper and one end of said casing at said respective dough discharge outlet end entry inlet openings thereof;

(e) an elongated shaft rotatably mounted between the other end of said casing and the other end wall of said hopper and extending axially through said casing and extension and through said hopper along and spaced above its curved bottom wall;

(f) a plurality of vanes attached along an upstream portion of said shaft extending through said extension and along said bottom wall of said hopper, said vanes extending radially from said shaft, being aligned with one another along a spiral path and being displaced from one another axially along and circumferentially about said shaft, each of said vanes having a working face disposed at an angle to both longitudinal and transverse planes through said shaft and said respective vane so as to convey dough toward and through said discharge outlet opening in said one end wall of said hopper and through said extension upon rotation of said shaft; and (g) a screw conveyor and a conical member attached in tandem end-to-end relation along a downstream portion of said shaft extending through said casing, said screw conveyor being disposed upstream of said conical member and adapted to convey dough through said casing toward said conical member upon rotation of said shaft, said conical member and screw conveyor having adjacent portions overlying said slit in said casing and said conical member being oriented in opposing working relation to said screw conveyor such that axial flow of dough through said casing and past said slit is resisted by said conical member thereby causing radial flow of dough from said casing through said slit.

10. The machine as recited in claim 9, further comprising:

a plurality of bars arranged in substantially parallel spaced relation to one another between said end walls of said hopper and extending substantially horizontally across said hopper between said opposite side walls thereof, said bars extending between said vanes attached on said shaft and for regulating the gravity flow of upper portions of the mass of dough to said vanes as lower portions of the dough are conveyed axially along said shaft toward said casing.

11. The machine as recited in claim 1, further comprising:

a plurality of bars arranged in substantially parallel spaced relation to one another and extending substantially horizontally across said hopper between said vanes, said bars for regulating the gravity flow of upper portions of the mass of dough to said vanes as lower portions of the dough are conveyed axially along said shaft toward said casing.

* * * * *